US012634681B2

(12) United States Patent
Elshafie et al.

(10) Patent No.: US 12,634,681 B2
(45) Date of Patent: May 19, 2026

(54) USER EQUIPMENT STATUS INFORMATION REPORTING

(71) Applicant: QUALCOMM Incorporated, San Diego, CA (US)

(72) Inventors: Ahmed Elshafie, San Diego, CA (US); Huilin Xu, Temecula, CA (US); Seyedkianoush Hosseini, San Diego, CA (US); Wei Yang, San Diego, CA (US); Linhai He, San Diego, CA (US); Yuchul Kim, San Diego, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 812 days.

(21) Appl. No.: 18/054,618

(22) Filed: Nov. 11, 2022

(65) Prior Publication Data

US 2024/0163659 A1 May 16, 2024

(51) Int. Cl.
*H04W 8/24* (2009.01)
*H04W 28/02* (2009.01)
*H04W 52/54* (2009.01)
*H04W 72/20* (2023.01)

(52) U.S. Cl.
CPC ......... *H04W 8/24* (2013.01); *H04W 28/0278* (2013.01); *H04W 52/54* (2013.01); *H04W 72/20* (2023.01)

(58) Field of Classification Search
None
See application file for complete search history.

(56) References Cited

U.S. PATENT DOCUMENTS

2015/0303741 A1* 10/2015 Malik ................... H02J 50/001
307/104

FOREIGN PATENT DOCUMENTS

WO WO-2020131834 A1 * 6/2020 ............ H04W 72/23

* cited by examiner

*Primary Examiner* — Willie J Daniel, Jr.
(74) *Attorney, Agent, or Firm* — Harrity & Harrity, LLP

(57) ABSTRACT

Various aspects of the present disclosure generally relate to wireless communication. In some aspects, a first user equipment (UE) may receive, from one of a programmable logic controller (PLC) or a network node, a configuration. The first UE may transmit, to one or more of a second UE, the PLC, or the network node, and based at least in part on the configuration, status information associated with the first UE, the status information being associated with an ability of the first UE to perform one or more of: data relaying for other UEs; a reading of radio frequency (RF) signals associated with reading or processing information from one or more zero power internet of things (ZP-IoT) devices and a relaying of information associated with the RF signal; or a transmission of wireless energy to one or more ZP-IoT devices. Numerous other aspects are described.

30 Claims, 11 Drawing Sheets

600

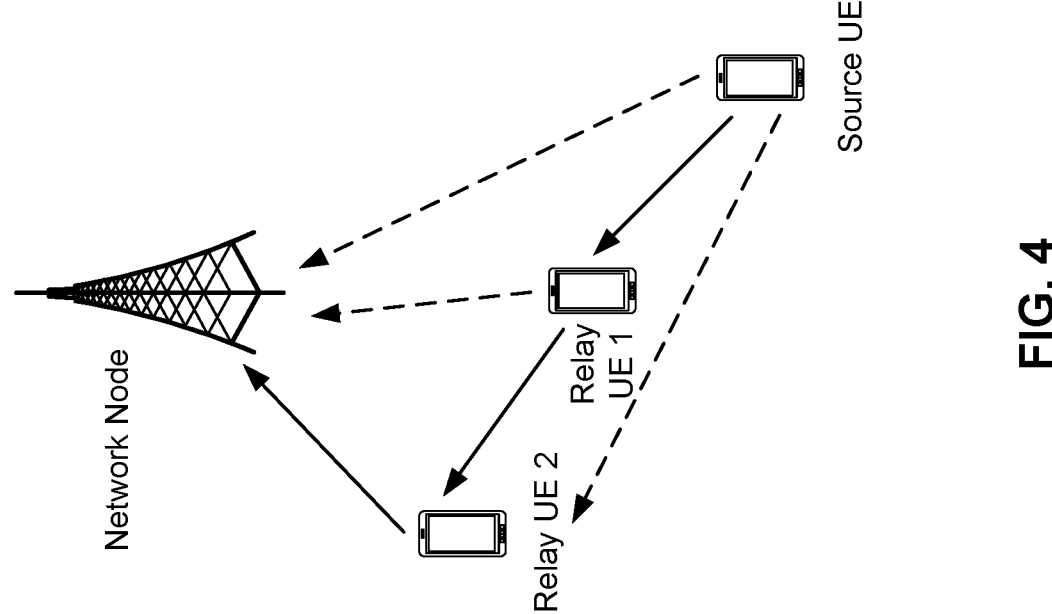
Network Node
Relay UE 2
Relay UE 1
Source UE
400
FIG. 4

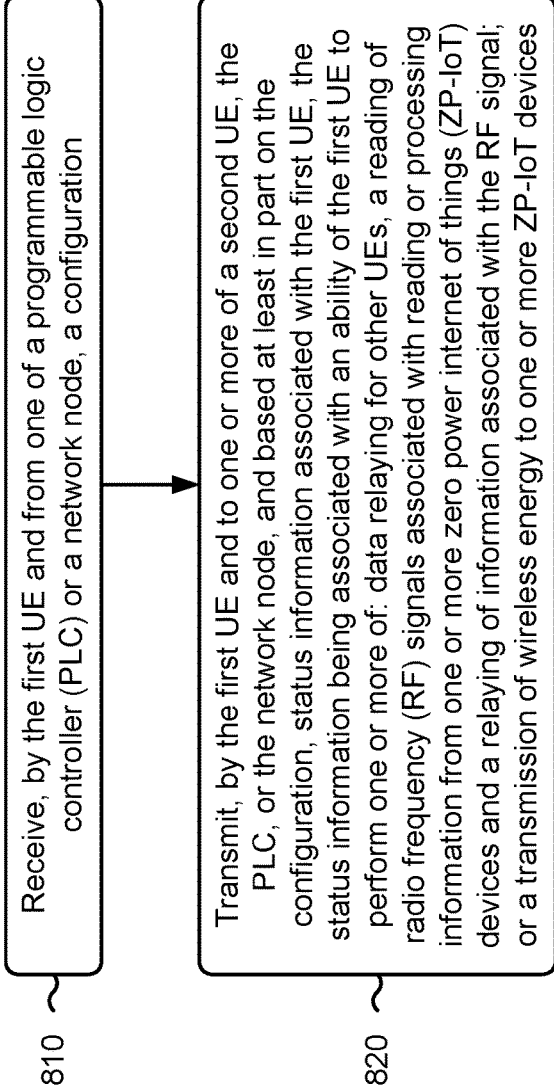

810 Receive, by the first UE and from one of a programmable logic controller (PLC) or a network node, a configuration 820 Transmit, by the first UE and to one or more of a second UE, the PLC, or the network node, and based at least in part on the configuration, status information associated with the first UE, the status information being associated with an ability of the first UE to perform one or more of: data relaying for other UEs, a reading of radio frequency (RF) signals associated with reading or processing information from one or more zero power internet of things (ZP-IoT) devices and a relaying of information associated with the RF signal; or a transmission of wireless energy to one or more ZP-IoT devices

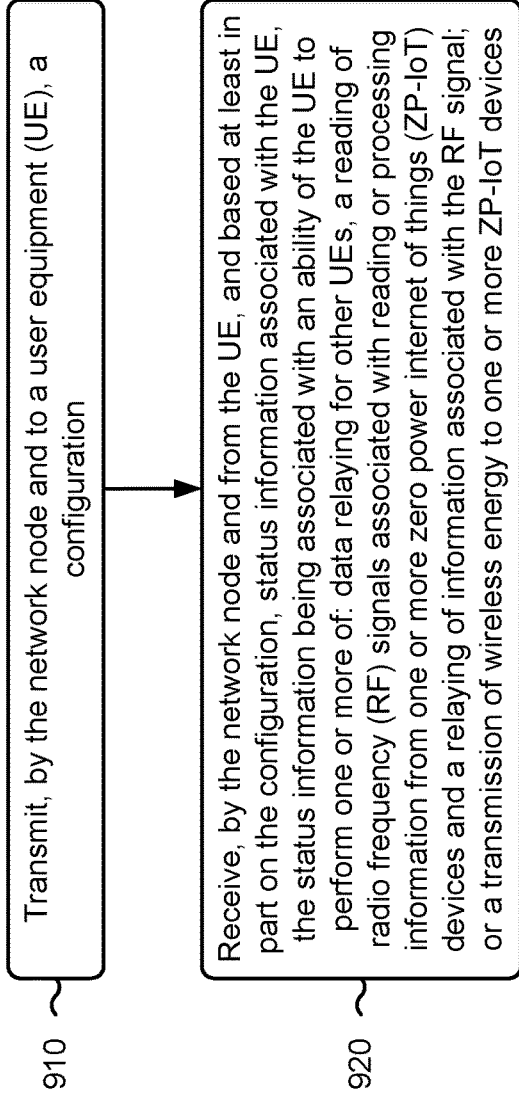

900

910

Transmit, by the network node and to a user equipment (UE), a configuration

920

Receive, by the network node and from the UE, and based at least in part on the configuration, status information associated with the UE, the status information being associated with an ability of the UE to perform one or more of: data relaying for other UEs, a reading of radio frequency (RF) signals associated with reading or processing information from one or more zero power internet of things (ZP-IoT) devices and a relaying of information associated with the RF signal; or a transmission of wireless energy to one or more ZP-IoT devices

FIG. 9

USER EQUIPMENT STATUS INFORMATION REPORTING

FIELD OF THE DISCLOSURE

Aspects of the present disclosure generally relate to wireless communication and to techniques and apparatuses for user equipment (UE) status information reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a first user equipment (UE). The apparatus may include a memory and one or more processors. The one or more processors, based at least in part on information stored in the memory, may be configured to receive, from one of a programmable logic controller (PLC) or a network node, a configuration. The one or more processors, based at least in part on information stored in the memory, may be configured to transmit, to one or more of a second UE, the PLC, or the network node, and based at least in part on the configuration, status information associated with the first UE, the status information being associated with an ability of the first UE to perform one or more of: data relaying for other UEs; a reading of radio frequency (RF) signals associated with reading or processing information from one or more zero power internet of things (ZP-IoT) devices and a relaying of information associated with the RF signal; or a transmission of wireless energy to one or more ZP-IoT devices.

Some aspects described herein relate to an apparatus for wireless communication at a network node. The apparatus may include a memory and one or more processors. The one or more processors, based at least in part on information stored in the memory, may be configured to transmit, to a UE, a configuration. The one or more processors, based at least in part on information stored in the memory, may be configured to receive, from the UE and based at least in part on the configuration, status information associated with the UE, the status information being associated with an ability of the UE to perform one or more of: data relaying for other UEs; a reading of RF signals associated with reading or processing information from one or more ZP-IoT devices and a relaying of information associated with the RF signal; or a transmission of wireless energy to one or more ZP-IoT devices.

Some aspects described herein relate to a method of wireless communication performed by a first UE. The method may include receiving, by the first UE and from one of a PLC or a network node, a configuration. The method may include transmitting, by the first UE and to one or more of a second UE, the PLC, or the network node, and based at least in part on the configuration, status information associated with the first UE, the status information being associated with an ability of the first UE to perform one or more of: data relaying for other UEs; a reading of RF signals associated with reading or processing information from one or more ZP-IoT devices and a relaying of information associated with the RF signal; or a transmission of wireless energy to one or more ZP-IoT devices.

Some aspects described herein relate to a method of wireless communication performed by a network node. The method may include transmitting, by the network node and to a UE, a configuration. The method may include receiving, by the network node and from the UE, and based at least in part on the configuration, status information associated with the UE, the status information being associated with an ability of the UE to perform one or more of: data relaying for other UEs; a reading of RF signals associated with reading or processing information from one or more ZP-IoT devices and a relaying of information associated with the RF signal; or a transmission of wireless energy to one or more ZP-IoT devices.

Some aspects described herein relate to a non-transitory computer-readable medium that stores a set of instructions for wireless communication by a first UE. The set of instructions, when executed by one or more processors of the first UE, may cause the first UE to receive, from one of a PLC or a network node, a configuration. The set of instructions, when executed by one or more processors of the first UE, may cause the first UE to transmit, to one or more of a second UE, the PLC, or the network node, and based at least in part on the configuration, status information associated with the first UE, the status information being associated with an ability of the first UE to perform one or more of: data relaying for other UEs; a reading of RF signals associated with reading or processing information from one or more ZP-IoT devices and a relaying of information associated with the RF signal; or a transmission of wireless energy to one or more ZP-IoT devices.

Some aspects described herein relate to a non-transitory computer-readable medium that stores a set of instructions for wireless communication by a network node. The set of instructions, when executed by one or more processors of the network node, may cause the network node to transmit, to a UE, a configuration. The set of instructions, when executed by one or more processors of the network node, may cause the network node to receive, from the UE and based at least in part on the configuration, status information associated with the UE, the status information being associated with an ability of the UE to perform one or more of: data relaying for other UEs; a reading of RF signals associated with reading or processing information from one or more ZP-IoT devices and a relaying of information associated with the RF signal; or a transmission of wireless energy to one or more ZP-IoT devices.

Some aspects described herein relate to a first apparatus for wireless communication. The first apparatus may include means for receiving, from one of a PLC or a network node, a configuration. The first apparatus may include means for transmitting, to one or more of a second apparatus, the PLC, or the network node, and based at least in part on the configuration, status information associated with the first apparatus, the status information being associated with an ability of the first apparatus to perform one or more of: data relaying for other apparatuses; a reading of RF signals associated with reading or processing information from one or more ZP-IoT devices and a relaying of information associated with the RF signal; or a transmission of wireless energy to one or more ZP-IoT devices.

Some aspects described herein relate to an apparatus for wireless communication. The apparatus may include means for transmitting, to a UE, a configuration. The apparatus may include means for receiving, from the UE and based at least in part on the configuration, status information associated with the UE, the status information being associated with an ability of the UE to perform one or more of: data relaying for other UEs; a reading of RF signals associated with reading or processing information from one or more ZP-IoT devices and a relaying of information associated with the RF signal; or a transmission of wireless energy to one or more ZP-IoT devices.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, RF chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of uplink tunneling via relays, in accordance with the present disclosure.

FIGS. 8-9 are diagrams illustrating example processes associated with UE status information reporting, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
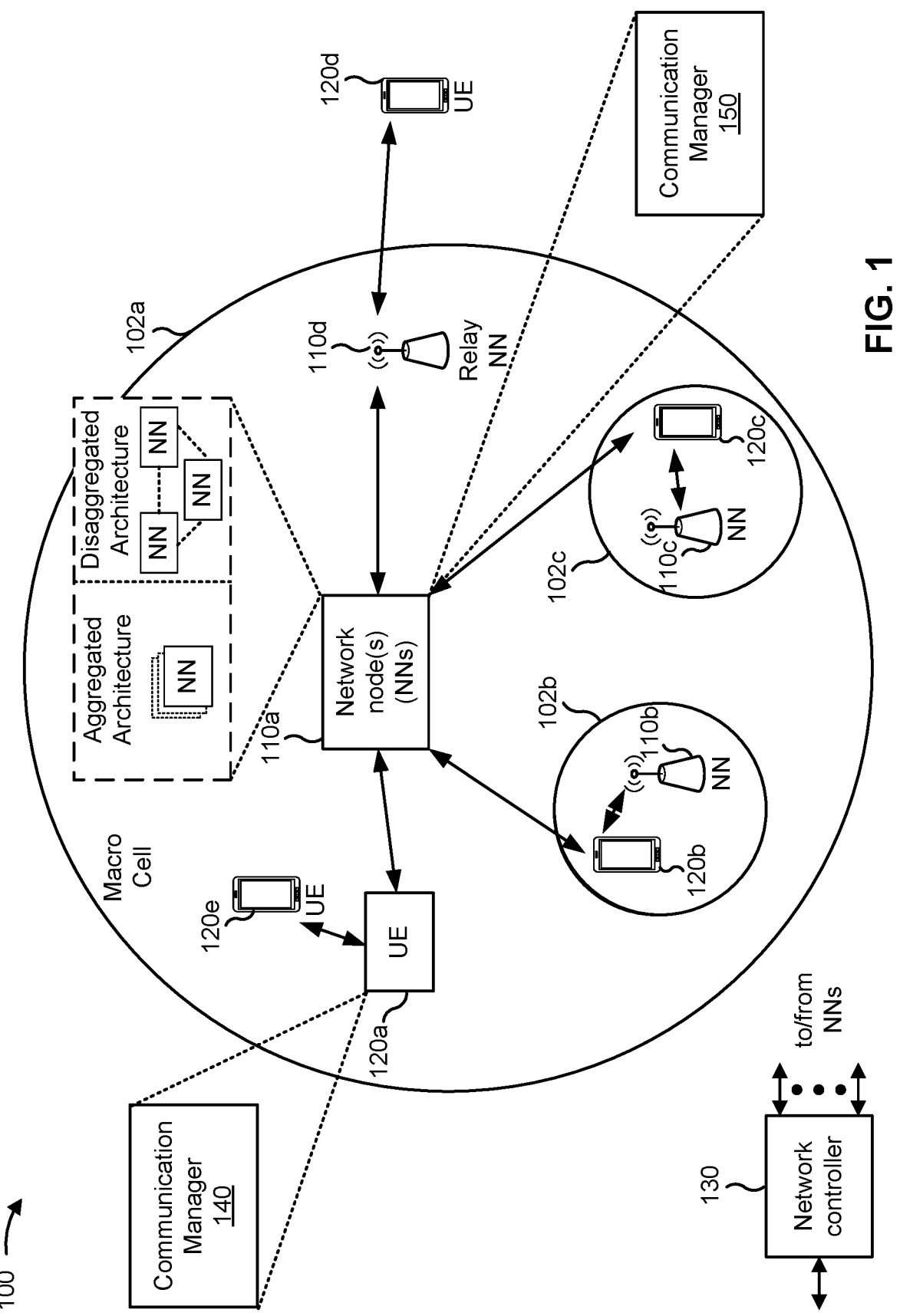
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first UE (e.g., UE 120a) may include a communication manager 140. As described in more detail elsewhere herein, the communication manager 140 may receive, from one of a programmable logic controller (PLC) or a network node, a configuration; and transmit, to one or more of a second UE, the PLC, or the network node, and based at least in part on the configuration, status information associated with the first UE, the status information being associated with an ability of the first UE to perform one or more of: data relaying for other UEs; a reading of radio frequency (RF) signals associated with reading or processing information from one or more zero power internet of things (ZP-IoT) devices and a relaying of information associated with the RF signal; or a transmission of wireless energy to one or more ZP-IoT devices. Additionally, or alternatively, the communication manager 140 may perform one or more other operations described herein.

In some aspects, a network node (e.g., network node 110) may include a communication manager 150. As described in more detail elsewhere herein, the communication manager 150 may transmit, to a UE, a configuration; and receive, from the UE and based at least in part on the configuration, status information associated with the UE, the status information being associated with an ability of the UE to perform one or more of: data relaying for other UEs; a reading of RF signals associated with reading or processing information from one or more ZP-IoT devices and a relaying of information associated with the RF signal; or a transmission of wireless energy to one or more ZP-IoT devices. Additionally, or alternatively, the communication manager 150 may perform one or more other operations described herein.

As indicated above, FIG. 1 is provided as an example. Other examples may differ from what is described with regard to FIG. 1.

Figure 2:
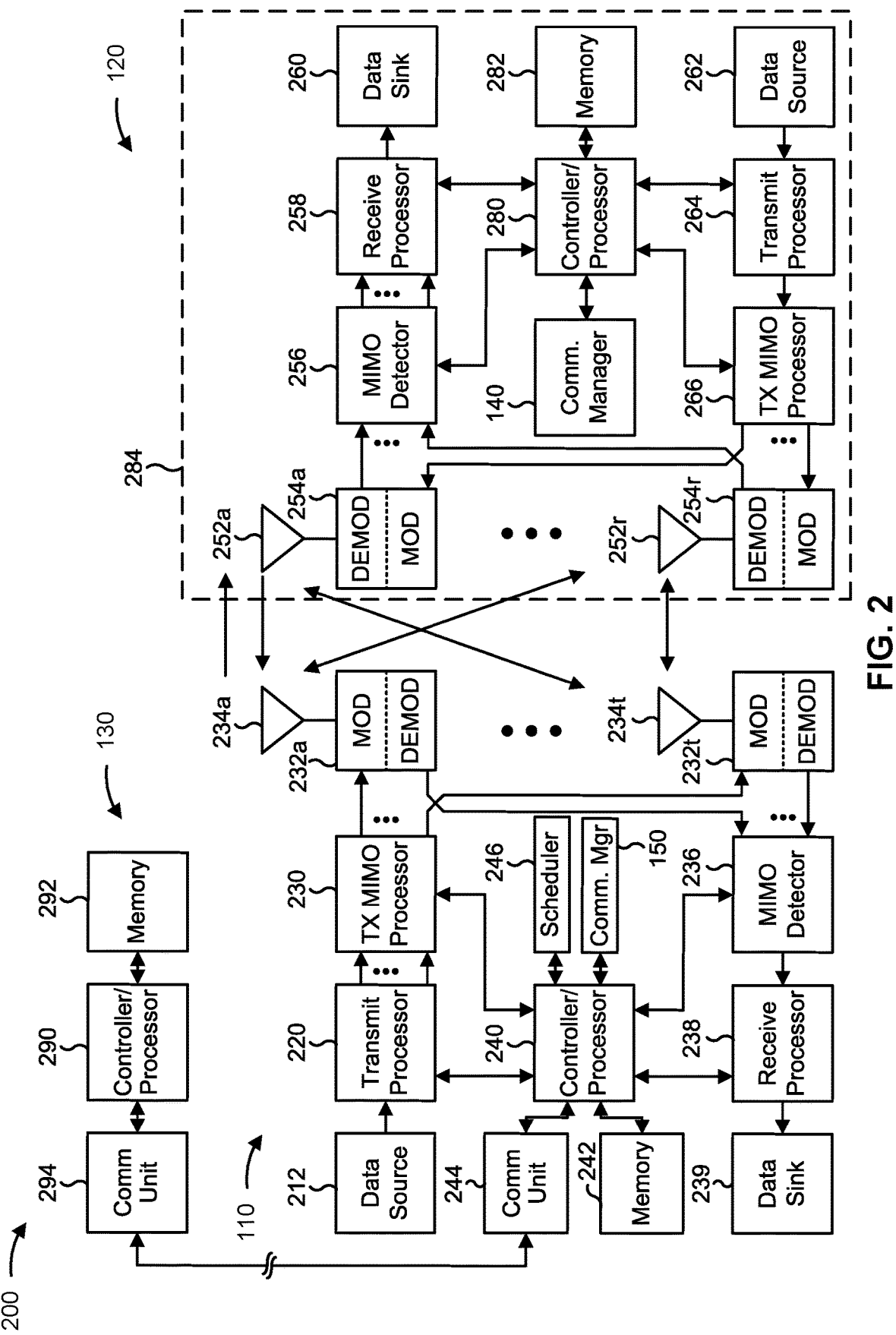
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T>1). The UE 120 may be equipped with a set of antennas 252a through 252r, such as R antennas (R>1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MC S(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the network node 110, the controller/processor 280 of the UE 120, and/or any other component(s) of FIG. 2 may perform one or more techniques associated with UE status information reporting, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a first UE (e.g., UE 120a) includes means for receiving, by the first UE and from one of a PLC or a network node, a configuration; and/or means for transmitting, by the first UE and to one or more of a second UE, the PLC, or the network node, and based at least in part on the configuration, status information associated with the first UE, the status information being associated with an ability of the first UE to perform one or more of: data relaying for other UEs; a reading of RF signals associated with reading or processing information from one or more ZP-IoT devices and a relaying of information associated with the RF signal; or a transmission of wireless energy to one or more ZP-IoT devices. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for transmitting, by the network node and to a UE, a configuration; and/or means for receiving, by the network node and from the UE, and based at least in part on the configuration, status information associated with the UE, the status information being associated with an ability of the UE to perform one or more of: data relaying for other UEs; a reading of RF signals associated with reading or processing information from one or more ZP-IoT devices and a relaying of information associated with the RF signal; or a transmission of wireless energy to one or more ZP-IoT devices. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
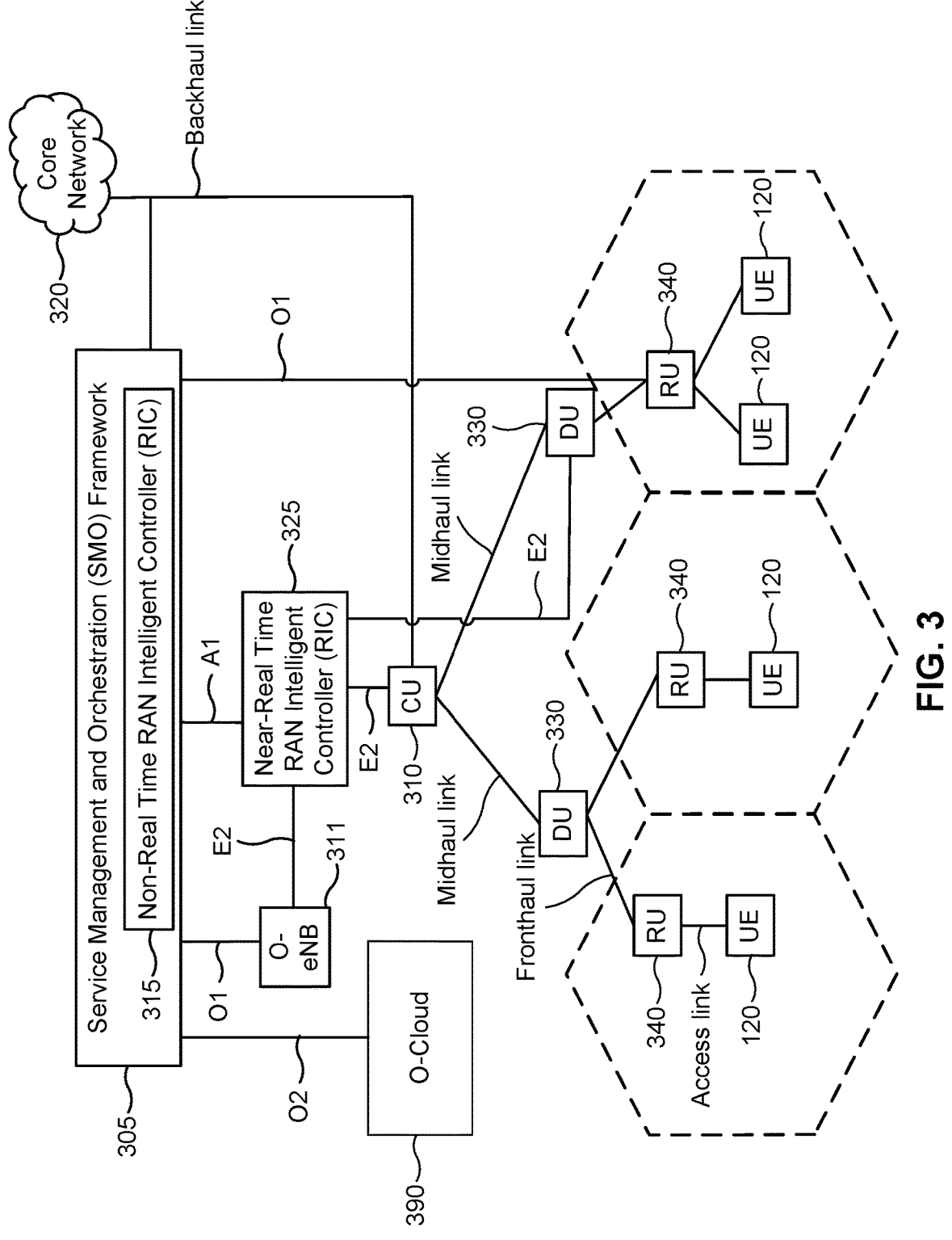
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective RF access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 inter-face). For virtualized network elements, the SMO Frame-work 305 may be configured to interact with a cloud computing platform (such as an open cloud (O-Cloud) platform 390) to perform network element life cycle man-agement (such as to instantiate virtualized network ele-ments) via a cloud computing platform interface (such as an O2 interface). Such virtualized network elements can include, but are not limited to, CUs 310, DUs 330, RUs 340, non-RT RICs 315, and Near-RT RICs 325. In some imple-mentations, the SMO Framework 305 can communicate with a hardware aspect of a 4G RAN, such as an open eNB (O-eNB) 311, via an O1 interface. Additionally, in some implementations, the SMO Framework 305 can communi-cate directly with each of one or more RUs 340 via a respective O1 interface. The SMO Framework 305 also may include a Non-RT RIC 315 configured to support function-ality of the SMO Framework 305.

The Non-RT RIC 315 may be configured to include a logical function that enables non-real-time control and opti-mization of RAN elements and resources, Artificial Intelli-gence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Frame-work 305 or the Non-RT RIC 315 from non-network data sources or from network functions. In some examples, the Non-RT RIC 315 or the Near-RT RIC 325 may be config-ured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

FIG. 4 is a diagram illustrating an example 400 of uplink tunneling via relays, in accordance with the present disclo-sure.

An uplink coverage enhancement may involve dedicated uplink tunneling via UE relays. A network node may use broadcast and/or groupcast to set up a multi-hop tunnel via UE relays. The network node may set up the multi-hop tunnel in dedicated time and frequency resources. A quantity of hops may be limited to one or more remote UEs and/or one or more relay UEs, based at least in part on a network node implementation.

As shown in FIG. 4, a source UE, a first relay UE (relay UE 1), and/or a second relay UE (relay UE 2) may receive, from a network node, groupcast signaling to set up an uplink relay tunnel. Based at least in part on the groupcast signal-ing, the source UE may transmit uplink data to the first relay UE. The first relay UE may forward the uplink data to the second relay UE. The second relay UE may forward the uplink data to the network node. As a result, the source UE may transmit the uplink data to the network node based at least in part on dedicated uplink tunneling via the first and second relay UEs.

A number of relaying configurations may be used for UEs. As an example, a UE may have a direct link to a network node and a next UE, but not to other UEs. As another example, a UE may have a direct link to other UEs, regardless of a hop number between the UE and the other UEs. As yet another example, UEs may be grouped into groups, where each group may communicate with a next group, and a single hop may be between groups.

As indicated above, FIG. 4 is provided as an example. Other examples may differ from what is described with respect to FIG. 4.

Figure 5:
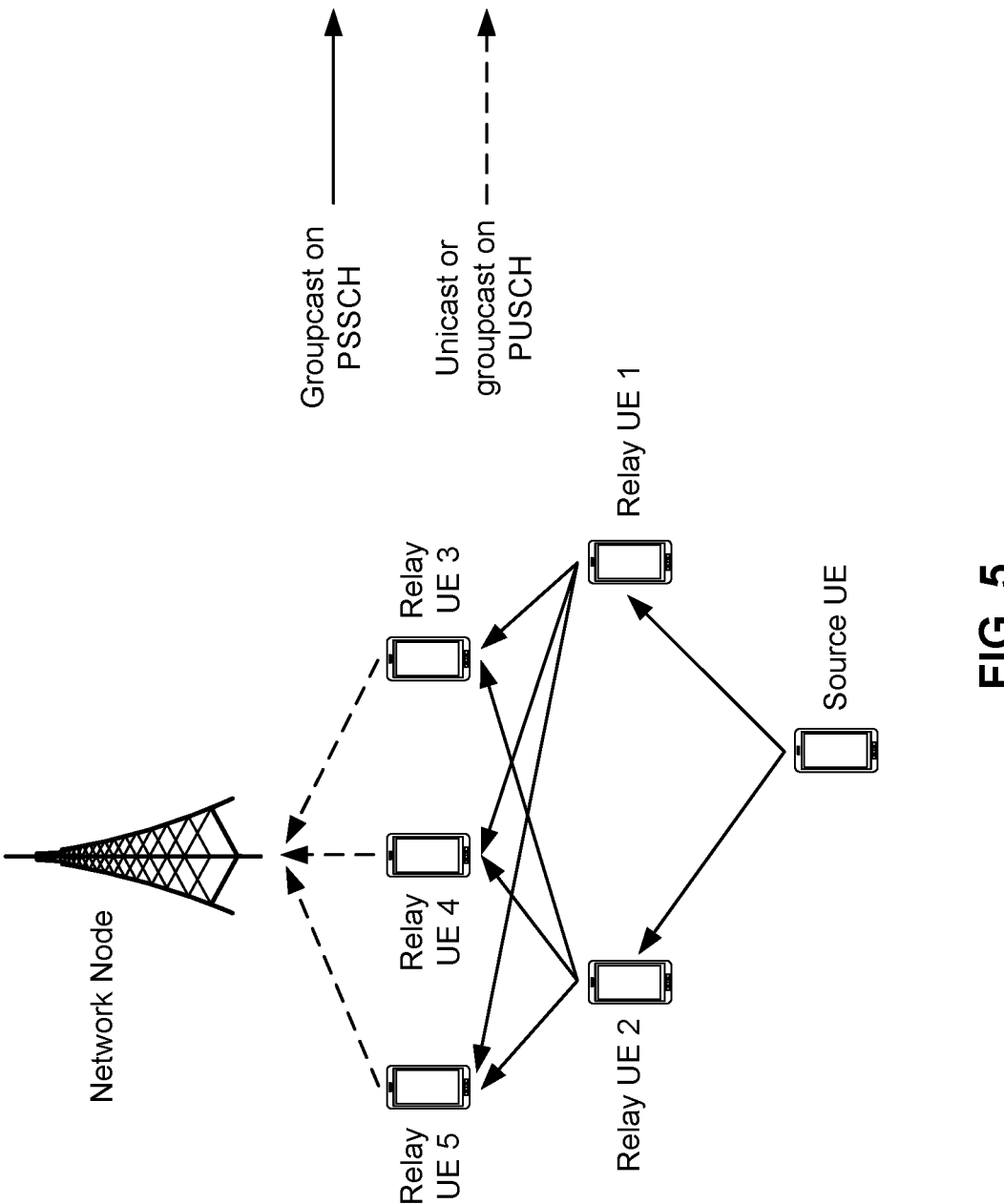
FIG. 5 is a diagram illustrating an example of uplink tunneling via relays, in accordance with the present disclosure.

FIG. 5 is a diagram illustrating an example 500 of uplink tunneling via relays, in accordance with the present disclo-sure.

As shown in FIG. 5, a source UE may transmit, via groupcast signaling on a physical sidelink shared channel (PSSCH), uplink data to a first relay UE (relay UE 1) and a second relay UE (relay UE 2). The first relay UE may transmit, via groupcast signaling on a PSSCH, the uplink data to a third UE (relay UE 3), a fourth UE (relay UE 4), and a fifth relay UE (relay UE 5). The second relay UE may transmit, via groupcast signaling on a PSSCH, the uplink data to the third, fourth and fifth relay UE. The third relay UE may transmit, via groupcast signaling on a physical uplink shared channel (PUSCH), the uplink data to a net-work node. The fourth relay UE may transmit, via groupcast signaling on a PUSCH, the uplink data to the network node. The fifth relay UE may transmit, via groupcast signaling on a PUSCH, the uplink data to the network node. As a result, the source UE may transmit uplink data to the network node based at least in part on a wideband dedicated uplink tunneling via multiple relay UEs.

As indicated above, FIG. 5 is provided as an example. Other examples may differ from what is described with respect to FIG. 5.

In sidelink, a first UE may be requested to relay data associated with a second UE. In other words, the first UE may be requested to relay other UE data. The data may include data packets and/or transport blocks (TBs). The first UE may allocate resource time, a physical buffer, and/or energy resources for relaying data associated with other UEs, such as the second UE. The first UE may allocate limited resources (e.g., buffer sizes) for relaying data associated with other UEs.

In some cases, multiple UEs may be available to assist the second UE, and/or multiple TB transmissions may occur from a network node to a destination UE, or from a source UE to the network node. The multiple TB transmissions may need to be relayed by one or more UEs. In these cases, one or more UEs may be selected from the multiple UEs to perform data relaying. However, such relay UE selection (or link selection) may lead to relatively high UE transmit powers, a relatively high number of UEs involved with data relaying, and/or relatively high interference between UEs and network nodes.

In various aspects of techniques and apparatuses described herein, a first UE may receive, from a PLC or a network node, a configuration. The configuration may enable the first UE to report status information associated with the first UE. The first UE may transmit, to a second UE, the PLC, and/or the network node, and based at least in part on the configuration, the status information associated with the first UE. The status information may indicate a remaining buffer capacity associated with the first UE. The status information may indicate a remaining energy and/or power associated with the first UE. The status information may be associated with an ability of the first UE to perform data relaying for other UEs, such as the second UE. The status information may be associated with an ability of the first UE to perform a reading of RF signals associated with reading or processing information from one or more ZP-IoT devices and a relaying of information associated with the RF signal. The status information may be associated with an ability of the first UE to perform a transmission of wireless energy to one or more ZP-IoT devices.

The one or more ZP-IoT devices may include energy harvesting devices and/or radio frequency identification (RFID) tag devices. A ZP-IoT device may be a UE (or a device) that includes two radios. A first radio may be a regular radio (e.g., a legacy UE radio). A second radio may be an energy harvesting or RFID tag radio. The second radio may be used based at least in part on a configuration from the network node, an energy availability, and/or a power saving mode at the UE. The second radio may be used based at least in part on a combination of a charging rate profile (e.g., a current and future/predicted charging rate at an EH/RFID tag from one or more energy harvesting technologies (e.g., RF, polar, thermal, vibration, etc.) including from transmissions from UEs and/or network units helping in the current network), a discharging rate profile (e.g., a current and future/predicted energy consumption including battery/energy storage leakage), and/or an energy state/availability profile (e.g., a current and future/predicted energy availability level/state) at the UE.

In some aspects, signaling between the first UE, the second UE, the PLC, and/or the network node may be defined to optimize a relay UE selection (or link selection). The relay UE selection may involve the selection of one or more UEs to relay data for another UE. The signaling may be associated with buffer state information reporting, time available for assisting other UEs by data relaying, and/or remaining available power or energy for data relaying.

In some aspects, when multiple UEs are available to assist a source UE with data relaying (e.g., a UE having a packet to be sent to the network node or to another UE), a UE from the multiple UEs may be selected based at least in part on a buffer status, energy, and/or time available to assist other UEs in relaying, associated with the UE, in relation to other UEs of the multiple UEs.

In some aspects, when multiple TB transmissions occur from the network node to a destination UE, or from the source UE to the network node, UEs may be selected for relaying based at least in part on the optimized relay UE selection. The optimized relay UE selection may reduce UE transmit powers, reduce the quantity of UEs that are used in relaying one TB (which may limit the participation of that UE in other tasks to help other UEs), and/or reduce interference caused by such UEs (e.g., relaying UEs) to other UEs or network nodes.

Figure 6:
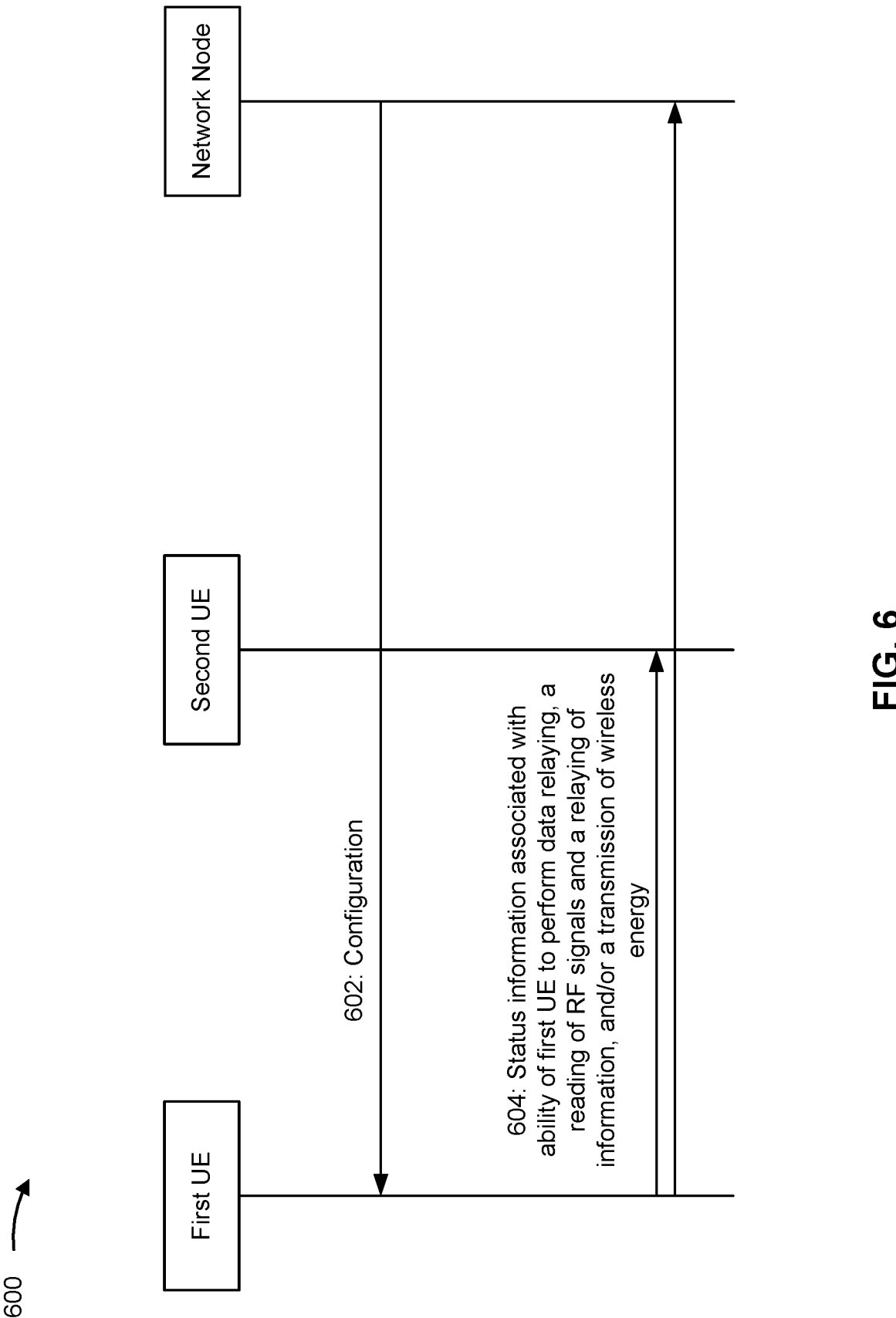
FIGS. 6-7 are diagrams illustrating examples associated with UE status information reporting, in accordance with the present disclosure.

FIG. 6 is a diagram illustrating an example 600 associated with UE status information reporting, in accordance with the present disclosure. As shown in FIG. 6, example 600 includes communication between a first UE (e.g., UE 120*a*), a second UE (e.g., UE 120*e*), and a network node (e.g., network node 110). In some aspects, the first UE, the second UE, and the network node may be included in a wireless network, such as wireless network 100.

In some aspects, the first UE and/or the second UE may refer to a UE, a network unit, a network entity, a RAN node, a network node, a relay node, an IAB node, a non-RAN node, a small cell, a customer premise equipment (CPE), a repeater, an activating/RF source deice, or another appropriate device.

As shown by reference number 602, the first UE may receive, from a PLC or a network node, a configuration. The configuration may configure or enable the first UE to report status information associated with the first UE. The configuration may indicate a type of status information reporting, a quantization level for the status information reporting, and/or a periodicity for transmitting the status information. The configuration may be configured as part of a channel state information (CSI) resource or resource set configuration, a physical uplink control channel (PUCCH) resource configuration, a report configuration of CSI, or a per resource pool configuration. In other words, the type, the quantization level, and/or the periodicity may be configured as part of the CSI resource or resource set configuration, the PUCCH resource configuration, the report configuration of CSI, or the per resource pool configuration. The configuration may indicate one or more uplink resources for transmitting the status information associated with the first UE. The one or more uplink resources may be PUCCH resources or PUSCH resources. The configuration may be associated with a layer 1 (L1) configuration, a layer 2 (L2) configuration, a layer 3 (L3) configuration, or a per resource pool configuration.

As shown by reference number 604, the first UE may transmit, to the second UE, the PLC, and/or the network node, and based at least in part on the configuration, the status information associated with the first UE. The status information may indicate a remaining buffer capacity associated with the first UE. The status information may indicate a remaining energy and/or power associated with the first UE. The status information may be associated with an ability of the first UE to perform data relaying for other UEs, such as the second UE. In this case, the status information may be relay status information. The status information may be associated with an ability of the first UE to perform a reading of RF signals associated with reading or processing information from one or more ZP-IoT devices and a relaying of information associated with the RF signal. The status information may be associated with an ability of the first UE to perform a transmission of wireless energy to one or more ZP-IoT devices. The one or more ZP-IoT devices may include energy harvesting devices and/or RFID tag devices.

In some aspects, the status information associated with the first UE may indicate a remaining buffer capacity for the data relaying. The remaining buffer capacity may be in units of a nominal TB size. The remaining buffer capacity may be based at least in part on a total buffer capacity and an amount of currently buffered information. In some aspects, the status information associated with the first UE may indicate a remaining time for the data relaying for other UEs. The other UEs may be associated with a reference MCS, a certain quantity of layers, and/or a certain power level. The remaining time for the data relaying may be relative to a start time of data relaying or relative to a reference time unit used to transmit a nominal TB. In some aspects, the status information associated with the first UE may indicate a remaining power or energy for data relaying. The remaining power or energy for data relaying may be relative to an assigned energy reference or may be relative to an assigned energy value.

In some aspects, the status information associated with the first UE may indicate an expected latency for each packet to be relayed, or expected priorities to be able to relay or support or participate in. Each priority may be associated with a certain latency or delay requirement. The first UE may determine a value associated with the expected latency and/or the expected priorities. The first UE may determine the value based at least in part on a current, expected, or predicted power/energy state. The first UE may determine the value based at least in part on a current, expected, or predicted engagement in data reception or transmission, or engagement in other interfaces. The first UE may determine the value based at least in part on a current sleep mode or a current power/energy saving mode. The current sleep mode may be associated with turning off certain RF components, hardware components, software components, and/or firmware components.

In some aspects, using L1, L2, or L3 signaling, or using a per resource pool configuration, the PLC or the network node may configure the first UE (or a group of UEs) to transmit a relay status information report. The relay status information report may indicate a remaining time for data relaying, a remaining buffer for data relaying, and power/ energy for data relaying. The first UE may transmit the relay status information report via a CSI report, which may be transmitted to the PLC or to a controller UE. A periodicity for the relay status information report may be configured or preconfigured for the first UE.

In some aspects, the status information (e.g., the relay status information report) may indicate a remaining amount of space, memory, or buffer capacity in an information buffer in units of a nominal TB size. Alternatively, the status information may indicate a quantity of bits in the information buffer, which may be used to calculate the remaining amount of space, memory, or buffer capacity in the information buffer. For example, the first UE may report the total capacity of the information buffer (in bits) minus an amount of information currently stored in the information buffer (e.g., a current status, in bits), which may be in units of the nominal TB size. The status information may indicate the remaining amount of space, memory, or buffer capacity in the information buffer in order to indicate an amount of data relaying the first UE is able to perform. In some aspects, the status information may indicate a remaining time for assisting other UEs with data relaying, where the other UEs may be associated with a reference MCS, a quantity of layers, and/or power. The remaining time may be computed relative to the start time of relaying, or relative to the reference time unit used to transmit the nominal TB (or configured or pre-configured reference time). In some aspects, the status information may indicate a remaining energy and/or power for data relaying, which may be associated with a TB size. The remaining energy and/or power may be relative to the assigned energy reference or relative to the assigned energy value, which may be agreed between the first UE and the network node based at least in part on a UE capability. The assigned energy reference and/or the assigned energy value may be dynamically changed based at least in part on an L1, L2, or L3 indication.

In some aspects, the status information associated with the first UE may indicate whether the first UE supports one or more TBs of a certain size for the data relaying. The first UE may report whether the first UE supports one or more TBs with size X In some aspects, the status information associated with the first UE may indicate whether the first UE supports one or more symbols, slots, frames, or time units for the data relaying. The first UE may report whether the first UE supports one or X symbols, slots, frames, or time units for the data relaying.

In some aspects, the configuration may indicate one or more reference transmit power levels. In this case, the status information associated with the first UE may indicate an amount of data and a duration of data relaying for each reference transmit power level of the one or more reference transmit power levels, and/or a preferred reference transmit power level of the one or more reference transmit power levels. In some aspects, the network node may configure one or multiple reference transmit power levels (e.g., 0 dBm and/or 23 dBm), and the first UE may report the amount of data and duration of data relaying for each reference transmit power or its preferred reference transmit power. A transmit power may be a substantial portion of an overall power consumption. The power, MCS, and/or the quantity of processed layers may impact a data relaying power, so reference values may be used to compute an amount of relaying time that is permitted by the first UE.

In some aspects, the first UE may receive, from the network node, data to be relayed to the second UE. The first UE may transmit, to the network node, a hybrid automatic repeat request (HARQ)-acknowledgement (ACK) report based at least in part on the data received from the network node. The HARQ-ACK report may indicate the status information associated with the first UE. In some aspects, when the first UE transmits the HARQ-ACK to the network node for received data to be relayed to another UE (e.g., the second UE), the first UE may indicate a remaining energy, an amount of data, and/or a duration of data relaying to the network node together with the HARQ-ACK report.

In some aspects, the first UE may collect the status information associated with the first UE. The first UE may collect the status information in order to perform the data relaying. The status information may be indicative of the first UE's ability to perform the data relaying for another UE. In some aspects, the first UE may collect the status information in order to assist in reading and/or transmitting the RF signal. When the first UE is a full-duplex UE, the first UE may be able to both transmit the RF signal and read the RF signal, based at least in part on an ability to simultaneously transmit and receive continuous waves used for reading from RFID tags. After reading, the first UE (e.g., a reader UE) may relay the information associated with the RF signal to another device, such as the network node, the PLC (or network unit/controller) via a Uu interface or a sidelink interface, respectively. Whether the first UE has sufficient time for data relaying, sufficient energy for data relaying, and/or sufficient buffer capacity for data relaying may be considered during a relay UE selection. In some aspects, the first UE may collect the status information in order to transmit or transfer energy to the one or more energy harvesting devices, where the energy may be in the form of wireless energy. The wireless energy may be associated with RF, a laser, or another type. In the case of transmitting energy, the status information may include energy/power information but may not necessarily include buffer information and/or relay information (e.g., time remaining for data relaying).

In some aspects, the first UE may transmit the status information associated with the first UE using an L1 signal, an L2 signal, or an L3 signal, or the status information may be multiplexed with the L1 signal, the L2 signal, or the L3 signal. The first UE may transmit the status information associated with the first UE is transmitted in a HARQ-ACK report, CSI, a buffer status report (BSR), a power headroom report (PHR), a wakeup signal response, a scheduling request, a data signal, or a random access channel (RACH) message. In other words, quantities reported by the first UE may be signaled using L1, L2, or L3 signals or may be multiplexed/piggybacked with an L1, L2, or L3 signal. The first UE may report the quantities via a Uu link/interface (e.g., when the quantities are reported to the network node), via a sidelink interface (e.g., when the quantities are reported to other UEs), or via a new or other interface used by the UEs or a combination of interfaces used by UEs/devices In some aspects, the first UE may receive, from the network node, an assignment for the first UE to serve as a collector UE (or buffer status collecting UE) for a plurality of UEs, where the plurality of UEs may include the second UE. The first UE may receive, from the network node, a request for status information regarding the plurality of UEs. The request may be received based at least in part on the network node having data to transmit. The first UE may transmit, to the plurality of UEs, the request for status information. The first UE may receive, from the plurality of UEs including the second UE, status information associated with each of the plurality of UEs. The first UE may transmit, to the network node, a report indicating a UE of the plurality of UEs being able to relay the data. The report may be based at least in part on the status information associated with each of the plurality of UEs. In some aspects, the first UE may receive status information associated with the second UE based at least in part on a remaining buffer capacity for data relaying associated with the second UE satisfying a first threshold, a remaining time for data relaying associated with the second UE satisfying a second threshold, and/or a remaining power or energy for data relaying associated with the second UE satisfying a third threshold.

In some aspects, the network node may assign one of the UEs, such as the first UE, to collect buffer status information from other UEs. The other UEs may be a group of UEs and/or surrounding UEs, relative to a location of the first UE. Each group of UEs may be assigned a UE to act as a buffer status information collector, and a buffer status information reporting may be triggered by the network node. When the network node has data to transmit to a UE, such as the second UE, the network node may request buffer status information reports of some or all of the UEs from the first UE that is acting as the buffer status information collector. The network node having the data to transmit may function as a trigger for the network node to request the buffer status information reports from the first UE. The first UE may collect buffer status information from some or all of the UEs. The first UE may transmit, to the network node, a report based at least in part on the buffer status information collected from some or all of the UEs, if the process is related to relay UE selection. In some aspects, the report may indicate identifiers (IDs) of UEs having more than Z TBs or units of data relaying and sufficient energy to assist in relaying Z TBs or units. A nominal TB size may be used to compute a remaining buffer capacity, but the nominal TB size may not necessarily be an actual TB size for data. In other words, the report may indicate IDs of only UEs that are capable of relaying the data from the network node. The report may not indicate IDs of UEs that are not capable of relaying the data from the network node. In some aspects, the report may indicate buffer status information for all of the UEs. In this case, the report may not filter UEs that have capability or do not have capability to relay the data. In some aspects, the network node may signal an expected TB size of a next transmission. The first UE may indicate, in the report, IDs of UEs and/or buffer status information of such UEs that are capable of supporting the expected TB size.

As an example, in a group of UEs, the second UE may be capable of buffering Z1 TBs of size X A third UE may be capable of buffering $Z2<Z1$ TBs of size X A fourth UE may be capable of buffering $Z3<Z1$ TBs of size X The network node may request the first UE (e.g., the collector UE) to send IDs of UEs that are able to buffer at least Z1 TBs of size X The network node may use a TB size F, but the first UE may adjust sizes accordingly. The first UE may transmit, to the network node, an ID associated with the second UE because the second UE may be capable of buffering Z1 TBs of size X Alternatively, the network node may transmit the request to each UE. In other words, the network node may ask each UE whether the UE is able to buffer at least Z1 TBs of size X The network node may request that each UE transmit a bit (e.g., "1" for supports and "0" for does not support) to indicate whether that UE is able to buffer at least Z1 TBs of size X In this case, the second UE may respond with a "1", and the third UE and the fourth UE may each respond with a "0".

In some aspects, the first UE (e.g., the collector UE) may request the buffer status information from each of the other UEs, which may include the second UE. The second UE may be configured to report to the first UE, but the second UE may not transmit its buffer status information unless the second UE has a buffer room of more than $Y>=Z$, where Y is a remaining buffer capacity (in bits) and Z refers to a number of TBs or units. A value of Z may be configured via RRC signaling or via a medium access control control element (MAC-CE). In some cases, the value of Z may be set by the collector UE, and may be based at least in part on an indication from the network node. Additionally, the second UE may not transmit its buffer status information unless the second UE has the required energy to serve those Z TBs or units. In other words, the second UE may not transmit its buffer status information unless the second UE has sufficient remaining energy for data relaying and/or sufficient time for data relaying, in view of one or more given reference transmission parameters. As a result, an amount of overhead and communication between UEs may be reduced, such that only UEs that are able to support a more than Z normalized TB size (Z TBs of size X) will participate. These UEs may be able handle some TBs with certain sizes or multiple transmissions occurring in relatively short times.

As indicated above, FIG. 6 is provided as an example. Other examples may differ from what is described with respect to FIG. 6.

Figure 7:
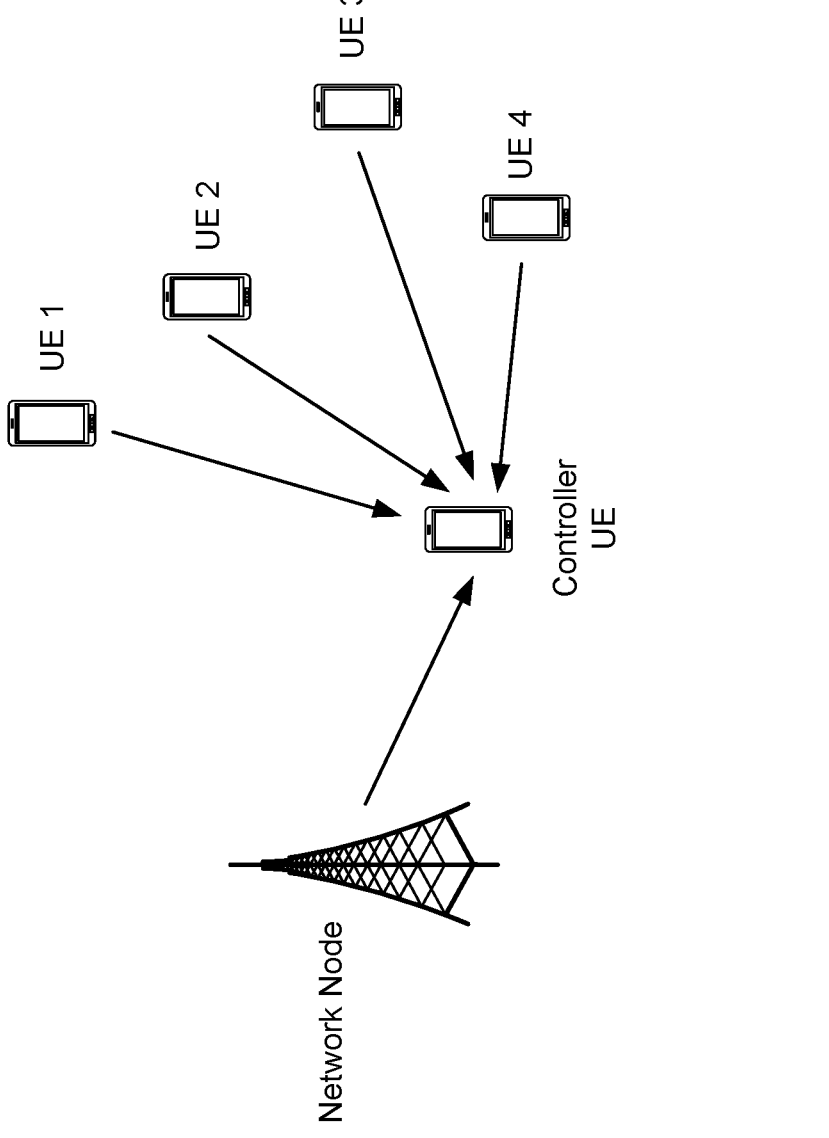

FIG. 7 is a diagram illustrating an example 700 associated with UE status information reporting, in accordance with the present disclosure.

As shown in FIG. 7, a network node may assign a UE to act as a collector UE. The collector UE may be able to collect buffer status information from a plurality of UEs. The plurality of UEs may be surrounding UEs. In other words, each of the plurality of UEs may be within a certain distance from the UE acting as the collector UE. When the network node has data to be transmitted to one of the plurality of UEs, the network node may request the collector UE to report buffer status information for the plurality of UEs. In other words, the network node may request the buffer status information for the plurality of UEs based at least in part on a trigger, where the trigger may correspond to the network node having the data to transmit. The UE may collect buffer status information from each of the plurality of UEs. The UE may receive the buffer status information from each of the plurality of UEs. The UE may transmit, to the network node, a report which may be based at least in part on the buffer status information from each of the plurality of UEs. For example, the report may indicate only UEs of the plurality of UEs that are capable of relaying the data. Alternatively, the report may indicate buffer status information for each of the plurality of UEs.

As indicated above, FIG. 7 is provided as an example. Other examples may differ from what is described with respect to FIG. 7.

FIG. 8 is a diagram illustrating an example process 800 performed, for example, by a first UE, in accordance with the present disclosure. Example process 800 is an example where the first UE (e.g., UE 120a) performs operations associated with UE status information reporting.

As shown in FIG. 8, in some aspects, process 800 may include receiving, from one of a PLC or a network node, a configuration (block 810). For example, the first UE (e.g., using reception component 1002, depicted in FIG. 10) may receive, from one of a PLC or a network node, a configuration, as described above.

As further shown in FIG. 8, in some aspects, process 800 may include transmitting, to one or more of a second UE, the PLC, or the network node, and based at least in part on the configuration, status information associated with the first UE, the status information being associated with an ability of the first UE to perform one or more of: data relaying for other UEs; a reading of RF signals associated with reading or processing information from one or more ZP-IoT devices and a relaying of information associated with the RF signal; or a transmission of wireless energy to one or more ZP-IoT devices (block 820). For example, the first UE (e.g., using transmission component 1004, depicted in FIG. 10) may transmit, to one or more of a second UE, the PLC, or the network node, and based at least in part on the configuration, status information associated with the first UE, the status information being associated with an ability of the first UE to perform one or more of: data relaying for other UEs; a reading of RF signals associated with reading or processing information from one or more ZP-IoT devices and a relaying of information associated with the RF signal; or a transmission of wireless energy to one or more ZP-IoT devices, as described above.

Process 800 may include additional aspects, such as any single aspect or any combination of aspects described below and/or in connection with one or more other processes described elsewhere herein.

In a first aspect, the configuration is associated with one of an L1 configuration, an L2 configuration, an L3 configuration, or a per resource pool configuration.

In a second aspect, alone or in combination with the first aspect, the configuration indicates one or more reference transmit power levels, and the status information associated with the first UE indicates one or more of an amount of data and a duration of data relaying for each reference transmit power level of the one or more reference transmit power levels, or a preferred reference transmit power level of the one or more reference transmit power levels.

In a third aspect, alone or in combination with one or more of the first and second aspects, the status information associated with the first UE indicates a remaining buffer capacity for the data relaying, wherein the remaining buffer capacity is in units of a nominal TB size, and the remaining buffer capacity is based at least in part on a total buffer capacity and an amount of currently buffered information.

In a fourth aspect, alone or in combination with one or more of the first through third aspects, the status information associated with the first UE indicates a remaining time for the data relaying for other UEs, wherein the other UEs are associated with a reference MCS, a certain quantity of layers, or a certain power level, and the remaining time for the data relaying is relative to a start time of data relaying or relative to a reference time unit used to transmit a nominal TB.

In a fifth aspect, alone or in combination with one or more of the first through fourth aspects, the status information associated with the first UE indicates a remaining power or energy for data relaying, wherein the remaining power or energy for data relaying is relative to an assigned energy reference or is relative to an assigned energy value.

In a sixth aspect, alone or in combination with one or more of the first through fifth aspects, the status information associated with the first UE indicates whether the first UE supports one or more TBs of a certain size for the data relaying, or the status information associated with the first UE indicates whether the first UE supports one or more symbols, slots, frames, or time units for the data relaying.

In a seventh aspect, alone or in combination with one or more of the first through sixth aspects, process 800 includes receiving, from the network node, data to be relayed to the second UE, and transmitting, to the network node, a HARQ-ACK report based at least in part on the data received from the network node, wherein the HARQ-ACK report indicates the status information associated with the first UE.

In an eighth aspect, alone or in combination with one or more of the first through seventh aspects, the status information associated with the first UE is transmitted using an L1 signal, an L2 signal, or an L3 signal, or the status information is multiplexed with the L1 signal, the L2 signal, or the L3 signal.

In a ninth aspect, alone or in combination with one or more of the first through eighth aspects, process 800 includes the status information associated with the first UE is transmitted in one of a HARQ-ACK report, CSI, a BSR, a PHR, a wakeup signal response, a scheduling request, a data signal, or a random access channel message.

In a tenth aspect, alone or in combination with one or more of the first through ninth aspects, the configuration indicates a type of status information reporting, a quantization level for the status information reporting, and a periodicity for transmitting the status information, and wherein the configuration is configured as part of a CSI resource or resource set configuration, a PUCCH resource configuration, a report configuration of CSI, or a per resource pool configuration.

In an eleventh aspect, alone or in combination with one or more of the first through tenth aspects, the configuration indicates one or more uplink resources for transmitting the status information associated with the first UE, and the one or more uplink resources are uplink control channel resources or uplink shared channel resources.

In a twelfth aspect, alone or in combination with one or more of the first through eleventh aspects, process 800 includes receiving, from the network node, an assignment for the first UE to serve as a collector UE for a plurality of UEs, wherein the plurality of UEs comprises the second UE, receiving, from the network node, a request for status information regarding the plurality of UEs, wherein the request is received based at least in part on the network node having data to transmit, transmitting, to the plurality of UEs, the request for status information, receiving, from the plurality of UEs comprising the second UE, status information associated with each of the plurality of UEs, and transmitting, to the network node, a report indicating a UE of the plurality of UEs being able to relay the data, wherein the report is based at least in part on the status information associated with each of the plurality of UEs.

In a thirteenth aspect, alone or in combination with one or more of the first through twelfth aspects, status information associated with the second UE is received based at least in part on one or more of a remaining buffer capacity for data relaying associated with the second UE satisfying a first threshold, a remaining time for data relaying associated with the second UE satisfying a second threshold, or a remaining power or energy for data relaying associated with the second UE satisfying a third threshold.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a network node, in accordance with the present disclosure. Example process 900 is an example where the network node (e.g., network node 110) performs operations associated with UE status information reporting.

As shown in FIG. 9, in some aspects, process 900 may include transmitting, to a UE, a configuration (block 910). For example, the network node (e.g., using transmission component 1104, depicted in FIG. 11) may transmit, to a UE, a configuration, as described above.

As further shown in FIG. 9, in some aspects, process 900 may include receiving, from the UE and based at least in part on the configuration, status information associated with the UE, the status information being associated with an ability of the UE to perform one or more of: data relaying for other UEs; a reading of RF signals associated with reading or processing information from one or more ZP-IoT devices and a relaying of information associated with the RF signal; or a transmission of wireless energy to one or more ZP-IoT devices (block 920). For example, the network node (e.g., using reception component 1102, depicted in FIG. 11) may receive, from the UE and based at least in part on the configuration, status information associated with the UE, the status information being associated with an ability of the UE to perform one or more of: data relaying for other UEs; a reading of RF signals associated with reading or processing information from one or more ZP-IoT devices and a relaying of information associated with the RF signal; or a transmission of wireless energy to one or more ZP-IoT devices, as described above.

Process 900 may include additional aspects, such as any single aspect or any combination of aspects described below and/or in connection with one or more other processes described elsewhere herein.

In a first aspect, the configuration is associated with one of an L1 configuration, an L2 configuration, an L3 configuration, or a per resource pool configuration.

In a second aspect, alone or in combination with the first aspect, the configuration indicates one or more reference transmit power levels, and the status information associated with the UE indicates one or more of an amount of data and a duration of data relaying for each reference transmit power level of the one or more reference transmit power levels, or a preferred reference transmit power level of the one or more reference transmit power levels.

In a third aspect, alone or in combination with one or more of the first and second aspects, the status information associated with the UE indicates a remaining buffer capacity for the data relaying, wherein the remaining buffer capacity is in units of a nominal TB size, and the remaining buffer capacity is based at least in part on a total buffer capacity and an amount of currently buffered information.

In a fourth aspect, alone or in combination with one or more of the first through third aspects, the status information associated with the UE indicates a remaining time for the data relaying for other UEs, wherein the other UEs are associated with a reference MCS, a certain quantity of layers, or a certain power level, and the remaining time for the data relaying is relative to a start time of data relaying or relative to a reference time unit used to transmit a nominal TB.

In a fifth aspect, alone or in combination with one or more of the first through fourth aspects, the status information associated with the UE indicates a remaining power or energy for data relaying, wherein the remaining power or energy for data relaying is relative to an assigned energy reference or is relative to an assigned energy value.

In a sixth aspect, alone or in combination with one or more of the first through fifth aspects, the status information associated with the UE indicates whether the UE supports one or more TBs of a certain size for the data relaying, or the status information associated with the UE indicates whether the UE supports one or more symbols, slots, frames, or time units for the data relaying.

In a seventh aspect, alone or in combination with one or more of the first through sixth aspects, process 800 includes transmitting, to the UE, data to be relayed to another UE, and receiving, from the UE, a HARQ-ACK report based at least in part on the data received from the network node, wherein the HARQ-ACK report indicates the status information associated with the UE.

In an eighth aspect, alone or in combination with one or more of the first through seventh aspects, the status information associated with the UE is transmitted using an L1 signal, an L2 signal, or an L3 signal, or the status information is multiplexed with the L1 signal, the L2 signal, or the L3 signal.

In a ninth aspect, alone or in combination with one or more of the first through eighth aspects, the status information associated with the UE is transmitted in one of a HARQ-ACK report, CSI, a BSR, a PHR, a wakeup signal response, a scheduling request, a data signal, or a random access channel message.

In a tenth aspect, alone or in combination with one or more of the first through ninth aspects, the configuration indicates a type of status information reporting, a quantization level for the status information reporting, and a periodicity for transmitting the status information, and wherein the configuration is configured as part of a CSI resource or resource set configuration, a PUCCH resource configuration, a report configuration of CSI, or a per resource pool configuration.

In an eleventh aspect, alone or in combination with one or more of the first through tenth aspects, the configuration indicates one or more uplink resources for transmitting the status information associated with the UE, and the one or more uplink resources are uplink control channel resources or uplink shared channel resources.

In a twelfth aspect, alone or in combination with one or more of the first through eleventh aspects, process 800 includes transmitting, to the UE, an assignment for the UE to serve as a collector UE for a plurality of UEs, wherein the plurality of UEs comprise a second UE, transmitting, to the UE, a request for status information regarding the plurality of UEs, wherein the request is transmitted based at least in part on the network node having data to transmit, and receiving, from the UE, a report indicating a UE of the plurality of UEs being able to relay the data, wherein the report is based at least in part on status information associated with each of the plurality of UEs.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
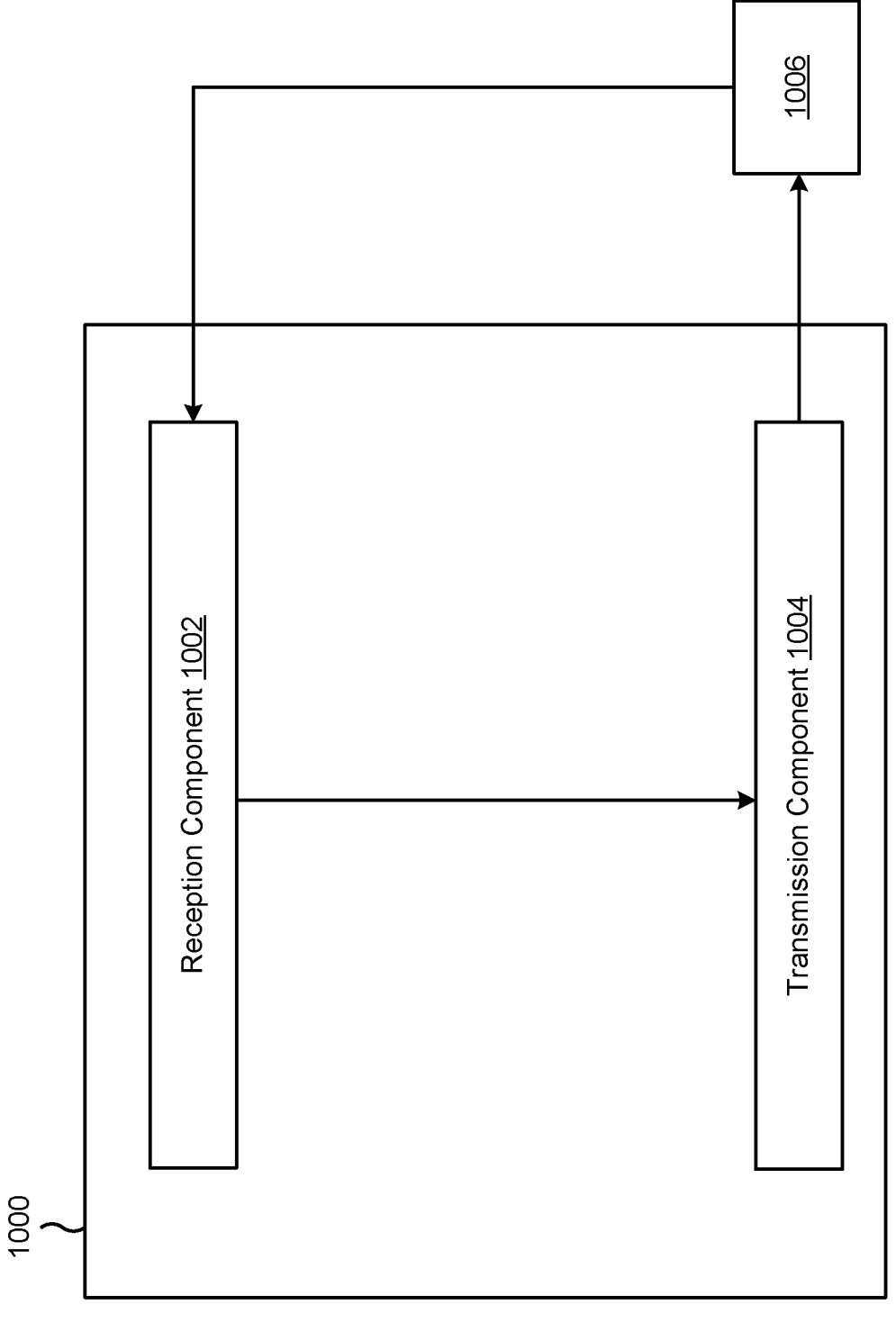
FIGS. 10-11 are diagrams of example apparatuses for wireless communication, in accordance with the present disclosure.

FIG. 10 is a diagram of an example apparatus 1000 for wireless communication, in accordance with the present disclosure. The apparatus 1000 may be a first UE, or a first UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the first UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the first UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the first UE described in connection with FIG. 2. In some aspects, the transmission component 1004 may be co-located with the reception component 1002 in a transceiver.

The reception component 1002 may receive, from one of a PLC or a network node, a configuration. The transmission component 1004 may transmit, to one or more of a second UE, the PLC, or the network node, and based at least in part on the configuration, status information associated with the first UE, the status information being associated with an ability of the first UE to perform one or more of: data relaying for other UEs; a reading of RF signals associated with reading or processing information from one or more ZP-IoT devices and a relaying of information associated with the RF signal; or a transmission of wireless energy to one or more ZP-IoT devices.

The reception component 1002 may receive, from the network node, data to be relayed to the second UE. The transmission component 1004 may transmit, to the network node, a HARQ-ACK report based at least in part on the data received from the network node, wherein the HARQ-ACK report indicates the status information associated with the first UE.

The reception component 1002 may receive, from the network node, an assignment for the first UE to serve as a collector UE for a plurality of UEs, wherein the plurality of UEs comprises the second UE. The reception component 1002 may receive, from the network node, a request for status information regarding the plurality of UEs, wherein the request is received based at least in part on the network node having data to transmit. The transmission component 1004 may transmit, to the plurality of UEs, the request for status information. The reception component 1002 may receive, from the plurality of UEs comprising the second UE, status information associated with each of the plurality of UEs. The transmission component 1004 may transmit, to the network node, a report indicating a UE of the plurality of UEs being able to relay the data, wherein the report is based at least in part on the status information associated with each of the plurality of UEs.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
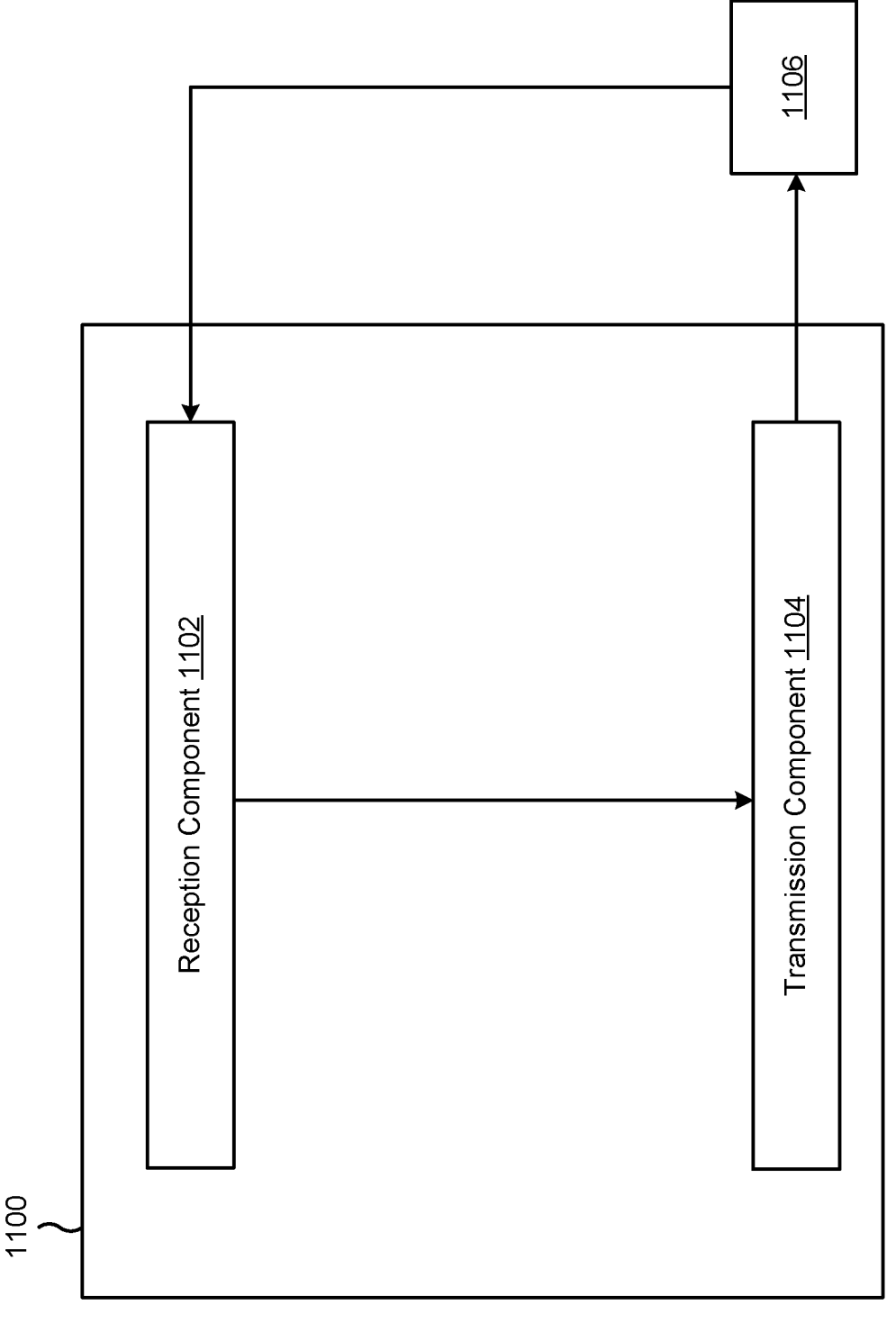

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The transmission component 1104 may transmit, to a UE, a configuration. The reception component 1102 may receive, from the UE and based at least in part on the configuration, status information associated with the UE, the status information being associated with an ability of the UE to perform one or more of: data relaying for other UEs; a reading of RF signals associated with reading or processing information from one or more ZP-IoT devices and a relaying of information associated with the RF signal; or a transmission of wireless energy to one or more ZP-IoT devices.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first user equipment (UE), comprising: receiving, by the first UE and from one of a programmable logic controller (PLC) or a network node, a configuration; and transmitting, by the first UE and to one or more of a second UE, the PLC, or the network node, and based at least in part on the configuration, status information associated with the first UE, the status information being associated with an ability of the first UE to perform one or more of: data relaying for other UEs; a reading of radio frequency (RF) signals associated with reading or processing information from one or more zero power internet of things (ZP-IoT) devices and a relaying of information associated with the RF signal; or a transmission of wireless energy to one or more ZP-IoT devices.

Aspect 2: The method of Aspect 1, wherein the configuration is associated with one of: a layer 1 configuration, a layer 2 configuration, a layer 3 configuration, or a per resource pool configuration.

Aspect 3: The method of any of Aspects 1-2, wherein: the configuration indicates one or more reference transmit power levels; and the status information associated with the first UE indicates one or more of: an amount of data and a duration of data relaying for each reference transmit power level of the one or more reference transmit power levels, or a preferred reference transmit power level of the one or more reference transmit power levels.

Aspect 4: The method of any of Aspects 1-3, wherein the status information associated with the first UE indicates a remaining buffer capacity for the data relaying, wherein the remaining buffer capacity is in units of a nominal transport block size, and wherein the remaining buffer capacity is based at least in part on a total buffer capacity and an amount of currently buffered information.

Aspect 5: The method of any of Aspects 1-4, wherein the status information associated with the first UE indicates a remaining time for the data relaying for other UEs, wherein the other UEs are associated with a reference modulation and coding scheme, a certain quantity of layers, or a certain power level, and wherein the remaining time for the data relaying is relative to a start time of data relaying or relative to a reference time unit used to transmit a nominal transport block.

Aspect 6: The method of any of Aspects 1-5, wherein the status information associated with the first UE indicates a remaining power or energy for data relaying, wherein the remaining power or energy for data relaying is relative to an assigned energy reference or is relative to an assigned energy value.

Aspect 7: The method of any of Aspects 1-6, wherein: the status information associated with the first UE indicates whether the first UE supports one or more transport blocks of a certain size for the data relaying; or the status information associated with the first UE indicates whether the first UE supports one or more symbols, slots, frames, or time units for the data relaying.

Aspect 8: The method of any of Aspects 1-7, further comprising: receiving, from the network node, data to be relayed to the second UE; and transmitting, to the network node, a hybrid automatic repeat request (HARQ)-acknowledgement (ACK) report based at least in part on the data received from the network node, wherein the HARQ-ACK report indicates the status information associated with the first UE.

Aspect 9: The method of any of Aspects 1-8, wherein: the status information associated with the first UE is transmitted using a layer 1 (L1) signal, a layer 2 (L2) signal, or a layer 3 (L3) signal, or the status information is multiplexed with the L1 signal, the L2 signal, or the L3 signal.

Aspect 10: The method of any of Aspects 1-9, wherein: the status information associated with the first UE is transmitted in one of: a hybrid automatic repeat request (HARQ)-acknowledgement (ACK) report, channel state information (CSI), a buffer status report (BSR), a power headroom report (PHR), a wakeup signal response, a scheduling request, a data signal, or a random access channel message.

Aspect 11: The method of any of Aspects 1-10, wherein the configuration indicates a type of status information reporting, a quantization level for the status information reporting, and a periodicity for transmitting the status information, and wherein the configuration is configured as part of a channel state information (CSI) resource or resource set configuration, a physical uplink control channel (PUCCH) resource configuration, a report configuration of CSI, or a per resource pool configuration.

Aspect 12: The method of any of Aspects 1-11, wherein the configuration indicates one or more uplink resources for transmitting the status information associated with the first UE, and wherein the one or more uplink resources are uplink control channel resources or uplink shared channel resources.

Aspect 13: The method of any of Aspects 1-12, further comprising: receiving, from the network node, an assignment for the first UE to serve as a collector UE for a plurality of UEs, wherein the plurality of UEs comprises the second UE; receiving, from the network node, a request for status information regarding the plurality of UEs, wherein the request is received based at least in part on the network node having data to transmit; transmitting, to the plurality of UEs, the request for status information; receiving, from the plurality of UEs comprising the second UE, status information associated with each of the plurality of UEs; and transmitting, to the network node, a report indicating a UE of the plurality of UEs being able to relay the data, wherein the report is based at least in part on the status information associated with each of the plurality of UEs.

Aspect 14: The method of Aspect 13, wherein status information associated with the second UE is received based at least in part on one or more of: a remaining buffer capacity for data relaying associated with the second UE satisfying a first threshold, a remaining time for data relaying associated with the second UE satisfying a second threshold, or a remaining power or energy for data relaying associated with the second UE satisfying a third threshold.

Aspect 15: A method of wireless communication performed by a network node, comprising: transmitting, by the network node and to a user equipment (UE), a configuration; and receiving, by the network node and from the UE, and based at least in part on the configuration, status information associated with the UE, the status information being associated with an ability of the UE to perform one or more of: data relaying for other UEs; a reading of radio frequency (RF) signals associated with reading or processing information from one or more zero power internet of things (ZP-IoT) devices and a relaying of information associated with the RF signal; or a transmission of wireless energy to one or more ZP-IoT devices.

Aspect 16: An apparatus for wireless communication at a device, comprising a processor; memory coupled with the processor; and instructions stored in the memory and executable by the processor to cause the apparatus to perform the method of one or more of Aspects 1-14.

Aspect 17: A device for wireless communication, comprising a memory and one or more processors coupled to the memory, the one or more processors configured to perform the method of one or more of Aspects 1-14.

Aspect 18: An apparatus for wireless communication, comprising at least one means for performing the method of one or more of Aspects 1-14.

Aspect 19: A non-transitory computer-readable medium storing code for wireless communication, the code comprising instructions executable by a processor to perform the method of one or more of Aspects 1-14.

Aspect 20: A non-transitory computer-readable medium storing a set of instructions for wireless communication, the set of instructions comprising one or more instructions that, when executed by one or more processors of a device, cause the device to perform the method of one or more of Aspects 1-14.

Aspect 21: An apparatus for wireless communication at a device, comprising a processor; memory coupled with the processor; and instructions stored in the memory and executable by the processor to cause the apparatus to perform the method of Aspect 15.

Aspect 22: A device for wireless communication, comprising a memory and one or more processors coupled to the memory, the one or more processors configured to perform the method of Aspect 15.

Aspect 23: An apparatus for wireless communication, comprising at least one means for performing the method of Aspect 15.

Aspect 24: A non-transitory computer-readable medium storing code for wireless communication, the code comprising instructions executable by a processor to perform the method of Aspect 15.

Aspect 25: A non-transitory computer-readable medium storing a set of instructions for wireless communication, the set of instructions comprising one or more instructions that, when executed by one or more processors of a device, cause the device to perform the method of Aspect 15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:

one or more memories; and one or more processors that, based at least in part on information stored in the one or more memories, are configured to:

receive, from one of a programmable logic controller (PLC) or a network node, a configuration, the configuration indicating one or more reference transmit power levels; and transmit, to one or more of a second UE, the PLC, or the network node, and based at least in part on the configuration, status information associated with the first UE, the status information being associated with an ability of the first UE to perform one or more of:

data relaying for other UEs;

a reading of radio frequency (RF) signals associated with reading or processing information from one or more zero power internet of things (ZP-IoT) devices and a relaying of information associated with the RF signal; or a transmission of wireless energy to one or more ZP-IOT devices, wherein the status information associated with the first UE indicates an amount of data and a duration for relaying data for each reference transmit power level of the one or more reference transmit power levels.

2. The apparatus of claim 1, wherein the configuration is associated with one of: a layer 1 configuration, a layer 2 configuration, a layer 3 configuration, or a per resource pool configuration.

3. The apparatus of claim 1, wherein:

the status information associated with the first UE indicates a preferred reference transmit power level of the one or more reference transmit power levels.

4. The apparatus of claim 1, wherein the status information associated with the first UE indicates a remaining buffer capacity for the data relaying, wherein the remaining buffer capacity is in units of a nominal transport block size, and wherein the remaining buffer capacity is based at least in part on a total buffer capacity and an amount of currently buffered information.

5. The apparatus of claim 1, wherein the status information associated with the first UE indicates a remaining time for the data relaying for other UEs, wherein the other UEs are associated with a reference modulation and coding scheme, a certain quantity of layers, or a certain power level, and wherein the remaining time for the data relaying is relative to a start time of data relaying or relative to a reference time unit used to transmit a nominal transport block.

6. The apparatus of claim 1, wherein the status information associated with the first UE indicates a remaining power or energy for data relaying, wherein the remaining power or energy for data relaying is relative to an assigned energy reference or is relative to an assigned energy value.

7. The apparatus of claim 1, wherein:
the status information associated with the first UE indicates whether the first UE supports one or more transport blocks of a certain size for the data relaying; or
the status information associated with the first UE indicates whether the first UE supports one or more symbols, slots, frames, or time units for the data relaying.

8. The apparatus of claim 1, wherein the one or more processors, based at least in part on the information stored in the one or more memories, are configured to:
receive, from the network node, data to be relayed to the second UE; and
transmit, to the network node, a hybrid automatic repeat request (HARQ)-acknowledgement (ACK) report based at least in part on the data received from the network node, wherein the HARQ-ACK report indicates the status information associated with the first UE.

9. The apparatus of claim 1, wherein:
the status information associated with the first UE is transmitted using a layer 1 (L1) signal, a layer 2 (L2) signal, or a layer 3 (L3) signal, or the status information is multiplexed with the L1 signal, the L2 signal, or the L3 signal.

10. The apparatus of claim 1, wherein:
the status information associated with the first UE is transmitted in one of: a hybrid automatic repeat request (HARQ)-acknowledgement (ACK) report, channel state information (CSI), a buffer status report (BSR), a power headroom report (PHR), a wakeup signal response, a scheduling request, a data signal, or a random access channel message.

11. The apparatus of claim 1, wherein the configuration indicates a type of status information reporting, a quantization level for the status information reporting, and a periodicity for transmitting the status information, and wherein the configuration is configured as part of a channel state information (CSI) resource or resource set configuration, a physical uplink control channel (PUCCH) resource configuration, a report configuration of CSI, or a per resource pool configuration.

12. The apparatus of claim 1, wherein the configuration indicates one or more uplink resources for transmitting the status information associated with the first UE, and wherein the one or more uplink resources are uplink control channel resources or uplink shared channel resources.

13. The apparatus of claim 1, wherein the one or more processors, based at least in part on the information stored in the one or more memories, are configured to:
receive, from the network node, an assignment for the first UE to serve as a collector UE for a plurality of UEs, wherein the plurality of UEs comprises the second UE;
receive, from the network node, a request for status information regarding the plurality of UEs, wherein the request is received based at least in part on the network node having data to transmit;
transmit, to the plurality of UEs, the request for status information;
receive, from the plurality of UEs comprising the second UE, status information associated with each of the plurality of UEs; and
transmit, to the network node, a report indicating a UE of the plurality of UEs being able to relay the data, wherein the report is based at least in part on the status information associated with each of the plurality of UEs.

14. The apparatus of claim 13, wherein status information associated with the second UE is received based at least in part on one or more of: a remaining buffer capacity for data relaying associated with the second UE satisfying a first threshold, a remaining time for data relaying associated with the second UE satisfying a second threshold, or a remaining power or energy for data relaying associated with the second UE satisfying a third threshold.

15. An apparatus for wireless communication at a network node, comprising:
one or more memories; and
one or more processors that, based at least in part on information stored in the one or more memories, are configured to:
transmit, to a user equipment (UE), a configuration, the configuration indicating one or more reference transmit power levels; and
receive, from the UE and based at least in part on the configuration, status information associated with the UE, the status information being associated with an ability of the UE to perform one or more of:
data relaying for other UEs;
a reading of radio frequency (RF) signals associated with reading or processing information from one or more zero power internet of things (ZP-IoT) devices and a relaying of information associated with the RF signal; or
a transmission of wireless energy to one or more ZP-IOT devices,
wherein the status information associated with the UE indicates an amount of data and a duration for relaying data for each reference transmit power level of the one or more reference transmit power levels.

16. A method of wireless communication performed by a first user equipment (UE), comprising:
receiving, by the first UE and from one of a programmable logic controller (PLC) or a network node, a configuration, the configuration indicating one or more reference transmit power levels; and
transmitting, by the first UE and to one or more of a second UE, the PLC, or the network node, and based at least in part on the configuration, status information associated with the first UE, the status information being associated with an ability of the first UE to perform one or more of:
data relaying for other UEs;
a reading of radio frequency (RF) signals associated with reading or processing information from one or more zero power internet of things (ZP-IoT) devices and a relaying of information associated with the RF signal; or
a transmission of wireless energy to one or more ZP-IOT devices, wherein the status information associated with the first UE indicates an amount of data and a duration for relaying data for each reference transmit power level of the one or more reference transmit power levels.

17. The method of claim 16, wherein the configuration is associated with one of: a layer 1 configuration, a layer 2 configuration, a layer 3 configuration, or a per resource pool configuration.

18. The method of claim 16, wherein:
the status information associated with the first UE indicates a preferred reference transmit power level of the one or more reference transmit power levels.

19. The method of claim 16, wherein the status information associated with the first UE indicates a remaining buffer capacity for the data relaying, wherein the remaining buffer capacity is in units of a nominal transport block size, and wherein the remaining buffer capacity is based at least in part on a total buffer capacity and an amount of currently buffered information.

20. The method of claim 16, wherein the status information associated with the first UE indicates a remaining time for the data relaying for other UEs, wherein the other UEs are associated with a reference modulation and coding scheme, a certain quantity of layers, or a certain power level, and wherein the remaining time for the data relaying is relative to a start time of data relaying or relative to a reference time unit used to transmit a nominal transport block.

21. The method of claim 16, wherein the status information associated with the first UE indicates a remaining power or energy for data relaying, wherein the remaining power or energy for data relaying is relative to an assigned energy reference or is relative to an assigned energy value.

22. The method of claim 16, wherein:
the status information associated with the first UE indicates whether the first UE supports one or more transport blocks of a certain size for the data relaying; or
the status information associated with the first UE indicates whether the first UE supports one or more symbols, slots, frames, or time units for the data relaying.

23. The method of claim 16, further comprising:
receiving, from the network node, data to be relayed to the second UE; and
transmitting, to the network node, a hybrid automatic repeat request (HARQ)-acknowledgement (ACK) report based at least in part on the data received from the network node, wherein the HARQ-ACK report indicates the status information associated with the first UE.

24. The method of claim 16, wherein:
the status information associated with the first UE is transmitted using a layer 1 (L1) signal, a layer 2 (L2) signal, or a layer 3 (L3) signal, or the status information is multiplexed with the L1 signal, the L2 signal, or the L3 signal.

25. The method of claim 16, wherein:
the status information associated with the first UE is transmitted in one of: a hybrid automatic repeat request (HARQ)-acknowledgement (ACK) report, channel state information (CSI), a buffer status report (BSR), a power headroom report (PHR), a wakeup signal response, a scheduling request, a data signal, or a random access channel message.

26. The method of claim 16, wherein the configuration indicates a type of status information reporting, a quantization level for the status information reporting, and a periodicity for transmitting the status information, and wherein the configuration is configured as part of a channel state information (CSI) resource or resource set configuration, a physical uplink control channel (PUCCH) resource configuration, a report configuration of CSI, or a per resource pool configuration.

27. The method of claim 16, wherein the configuration indicates one or more uplink resources for transmitting the status information associated with the first UE, and wherein the one or more uplink resources are uplink control channel resources or uplink shared channel resources.

28. The method of claim 16, further comprising:
receiving, from the network node, an assignment for the first UE to serve as a collector UE for a plurality of UEs, wherein the plurality of UEs comprises the second UE;
receiving, from the network node, a request for status information regarding the plurality of UEs, wherein the request is received based at least in part on the network node having data to transmit;
transmitting, to the plurality of UEs, the request for status information;
receiving, from the plurality of UEs comprising the second UE, status information associated with each of the plurality of UEs; and
transmitting, to the network node, a report indicating a UE of the plurality of UEs being able to relay the data, wherein the report is based at least in part on the status information associated with each of the plurality of UEs.

29. The method of claim 28, wherein status information associated with the second UE is received based at least in part on one or more of: a remaining buffer capacity for data relaying associated with the second UE satisfying a first threshold, a remaining time for data relaying associated with the second UE satisfying a second threshold, or a remaining power or energy for data relaying associated with the second UE satisfying a third threshold.

30. A method of wireless communication performed by a network node, comprising:
transmitting, by the network node and to a user equipment (UE), a configuration, the configuration indicating one or more reference transmit power levels; and
receiving, by the network node and from the UE, and based at least in part on the configuration, status information associated with the UE, the status information being associated with an ability of the UE to perform one or more of:
data relaying for other UEs;
a reading of radio frequency (RF) signals associated with reading or processing information from one or more zero power internet of things (ZP-IOT) devices and a relaying of information associated with the RF signal; or
a transmission of wireless energy to one or more ZP-IOT devices, wherein the status information associated with first UE indicates an amount of data and a duration for relaying data for each reference transmit power level of the one or more reference transmit power levels.

* * * * *